US010805798B2

(12) United States Patent
Green et al.

(10) Patent No.: US 10,805,798 B2
(45) Date of Patent: *Oct. 13, 2020

(54) MULTI-TIERED USER AUTHENTICATION METHODS

(71) Applicant: International Business Machines Corporation, Armonk, NY (US)

(72) Inventors: Sophie D. Green, Chelmsford (GB); Joe Pavitt, Hampshire (GB); Stephen D. Pipes, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,378

(22) Filed: Apr. 16, 2019

(65) Prior Publication Data

US 2019/0246274 A1 Aug. 8, 2019

Related U.S. Application Data

(63) Continuation of application No. 15/351,871, filed on Nov. 15, 2016, now Pat. No. 10,362,481.

(51) Int. Cl.
*H04W 12/06* (2009.01)
*H04L 29/06* (2006.01)

(52) U.S. Cl.
CPC .......... *H04W 12/06* (2013.01); *H04L 63/08* (2013.01); *H04L 63/083* (2013.01);
(Continued)

(58) Field of Classification Search
CPC .. H04W 12/06; H04L 63/083; H04L 63/0861; H04L 63/107; H04L 2463/082; H04L 63/08; H04L 63/108; H04L 63/205
See application file for complete search history.

(56) References Cited

U.S. PATENT DOCUMENTS

| 8,539,567 B1 * | 9/2013 | Logue | H04L 63/08 |
| | | | 726/7 |
| 2006/0015725 A1 * | 1/2006 | Voice | H04L 63/104 |
| | | | 713/168 |

(Continued)

OTHER PUBLICATIONS

Tobias Munch et al. "An Innovative Virtual Enterprise to Agile Micro and SME-Based Collaborative Betworks," IFIP international Federation for INformation Processing 2013, pp. 121-128, 2013. (Year: 2013).*

(Continued)

*Primary Examiner* — Luu T Pham
*Assistant Examiner* — Canh Le
(74) *Attorney, Agent, or Firm* — Nicholas D. Bowman; Hunter E. Webb; Keohane & D'Alessandro, PLLC

(57) ABSTRACT

Aspects of the present invention provide an approach for user authentication during a user session which potentially requires multiple user authentications. A library of authentication methods is provided for preforming the user authentications. For authentication, a threshold contribution value is set which needs to be exceeded for authentication to occur. To carry out the authentication, a chain of authentication methods is constructed at run time, selected from the library in order to provide an aggregate contribution value which exceeds the threshold. During run time, the contribution value of each authentication method is dynamically adjusted, so that construction of the chain uses current amounts for the contribution values of each authentication method. This allows the chain to be reconstructed at run time taking into account changing circumstances. Specifically, not yet executed authentication methods may be unlinked from the chain and replaced with one or more new ones.

19 Claims, 5 Drawing Sheets

(52) U.S. Cl.
CPC ........ *H04L 63/0861* (2013.01); *H04L 63/107* (2013.01); *H04L 63/205* (2013.01); *H04L 63/108* (2013.01); *H04L 2463/082* (2013.01)

(56) References Cited

U.S. PATENT DOCUMENTS

| | | | | |
|---|---|---|---|---|
| 2010/0299716 | A1* | 11/2010 | Rouskov | G06F 21/42 |
| | | | | 726/1 |
| 2013/0198807 | A1 | 8/2013 | Herbach et al. | |
| 2014/0130127 | A1 | 5/2014 | Toole et al. | |
| 2014/0172707 | A1* | 6/2014 | Kuntagod | G06Q 20/40145 |
| | | | | 705/44 |
| 2015/0229625 | A1 | 8/2015 | Grigg et al. | |
| 2015/0287017 | A1* | 10/2015 | Iqbal | G06Q 20/3224 |
| | | | | 705/44 |
| 2015/0287018 | A1 | 10/2015 | Iqbal et al. | |
| 2015/0287028 | A1* | 10/2015 | DeLuca | G06Q 20/40145 |
| | | | | 705/44 |
| 2016/0065554 | A1 | 3/2016 | Brown et al. | |
| 2017/0332233 | A1* | 11/2017 | Zhang | H04W 12/06 |
| 2018/0139606 | A1 | 5/2018 | Green et al. | |

OTHER PUBLICATIONS

Eric Yuan et al., "Attributed Based Access Control (ABAC) for Web Services", Proceedings of the IEEE International Conference on Web Services, 2005, (ICWS'05), 9 pages.

Daniel J. Dougherty et al., "Specifying and Reasoning about Dynamic Access-Control Policies", International Joint Conference on Automated Reasoning, 2006, 15 pages.

Carlos Ribeiro et al., "SPL: An access control language for security policies with complex constraints", 1999, In Proceedings of the Network and Distributed System Security Symposium, 19 pages.

Munjpara Priyesh Pravinbhai, "Implementation of Multi-tier Authentication Technique for Single-Sign On access of Cloud Services", May 2014, 50 pages.

Tobias Munch et al., "An Innovative Virtual Enterprise Approach to Agile Micro and SME-Based Collaboration Networks", IFIP, International Federation for Information Processing 2013, 8 pages.

Canh Le, USPTO Office Action, U.S. Appl. No. 15/351,871, dated May 8, 2018, 28 pages.

Canh Le, USPTO Final Office Action, U.S. Appl. No. 15/351,871, dated Dec. 7, 2018, 25 pages.

Canh Le, USPTO Notice of Allowance and Fees Due, U.S. Appl. No. 15/351,871, dated Mar. 13, 2019, 22 pages.

* cited by examiner

MULTI-TIERED USER AUTHENTICATION METHODS

RELATED APPLICATION DATA

The present patent document is a continuation of U.S. patent application Ser. No. 15/351,871, filed Nov. 15, 2016, entitled "MULTI-TIERED USER AUTHENTICATION METHODS", the disclosure of which is incorporated herein by reference.

TECHNICAL FIELD

In general, embodiments of the present invention relate to user authentication. Specifically, embodiments of the present invention relate to user authentication having multiple tiers that interact with a user during an authentication session to contribute to an overall confidence score regarding the user's claim of identity.

BACKGROUND

Multi-tiered authentication schemes are well known, for example in Internet banking. Taking the example of Internet banking, to start a session a user will often need to log in and the login process may involve at least one authentication tier, e.g. to provide a username and password. The user can then be allowed to view his bank account. If the user then wishes to carry out a banking transaction, the system will typically apply another authentication tier so that the confidence score required in respect of the user's purported identity is raised. This is a step-up in the authentication score being needed, hence the term step-up authentication schemes. If the user then wishes to change his personal details, e.g. his registered physical address or email address, then a very high authentication score may be required, i.e. another step up in the authentication process.

As well as the concept of multiple tiers of authentication, there is also the concept of multiple methods of authentication, which may be broken down into categories. Known categories include:

username/password authentication (which is an example of a knowledge-based test): this is a ubiquitous basic test where policies may be enforced to require regular changes in the password, and minimum requirements of the password in terms of length and variety of characters.

biometric: for example voice recognition, retina scan, fingerprint scan, face recognition.

challenge tests (which is an example of a knowledge-based test): here the user has to undergo testing in relation to pre-registered information or digital content. One type of challenge test is through challenge questions, such as name of first pet or make of first car, which would be difficult to steal by identity theft methods. Another example of a challenge test is picture recognition which might involve pre-registering pictures of friends which are then presented in a gallery containing pictures of random unknown people, with the authentication task being to select the friends. Another example picture recognition test is a requirement to click on multiple particular points on a single pre-registered picture, where these points are pre-registered with the picture.

code generation (which is an example of a possession-based test): a user may have a device for generating codes, referred to as a transaction number (TAN). One example is photo-TAN as described in EP1959374A1. With photo-TAN, the authentication requires the user to have physical possession of his registered mobile device loaded with an application to view with the camera the display of the personal computer on which the session is taking place, so the camera can take an image of a barcode or the like being displayed on the screen by the banking (or other) application software. Another example is TAN using a dedicated TAN generation device. With a TAN generation device, then the user's physical possession of the TAN generation device is required, and in some cases also the bank card, which needs to be inserted into the device.

location: a user may have his location checked, or more probably the location of the device with which he is logged on to the service. Location may be checked by any known method such as GPS, mobile phone tower triangulation, and/or wireless LAN signal strength of known wireless LANs, among others. Location may be integrated into a test by comparing current location with pre-registered safe locations, such as proximity to the user's home address, work address, or proximity to a SIM card installed in the user's car or other user-owned GPS-enabled devices, or based on an analysis of previous behavior.

In a multi-tier, step-up authentication scheme, the system will either re-apply the same authentication, but with a higher score being needed, or, more likely, will employ a different type of authentication. For example, one step up after login with username and password might be to invoke a TAN process or a biometric test.

US2014/0208419A1 discloses a multi-tiered authentication method which dynamically monitors the risk profile of a user during a session. An authentication level for each available service is set dynamically during the session based on said monitored risk profile. If the authentication level for a service is higher than the current authentication level for the user, a further authentication request is sent to the user with the aim of increasing the authentication level to that required to access the requested service.

US2015/0229625A1 discloses an authentication method based on discrete levels of authentication being needed to perform different groups of banking functions. The proposed authentication method also includes circumstantial data in the scoring. The circumstantial data is described as being location-based; either the user's current location in relation to recent previous locations or known historical behavior, or the user's location in relation to close family members or friends. The circumstantial data is also described as being based on behavior pattern analysis of current behavior compared against previous behavior in terms of use of the device with which the user is conducting the current session with the banking or other application.

US2014/0172707A1 describes a multi-tiered authentication scheme in which the initial authentication tier is by face recognition and the step-up involves re-running the face recognition, but with a better match being required, i.e. a higher threshold score, and also by applying a second type of authentication. For authentication, the system determines the type of the transaction which the user is requesting to perform, e.g. bank transfer, and from that selects an appropriate rule set, i.e. in this case one for bank transfers, from multiple pre-defined rule sets. Then, from that selected rule set, the system determines relevant factors related to the context in which the transaction is being requested in order to optimize the authentication. It is also described that the threshold score can be varied according to the environmental conditions of the session. For face recognition, it is proposed that if there are low or high ambient light conditions then the threshold should be reduced to ensure the face recognition can still work. For voice recognition, it is proposed that the threshold can be adjusted up or down according to the level of background noise. To avoid these sensitivity adjustments compromising the security of the authentication process, it is proposed that the weight given to different authentication types is also varied during the session. In a noisy environment, the system can give greater weight to a face recognition mode of authentication and a lower weight to a voice recognition mode of authentication. In an environment of low ambient light, the system can give a greater weight to a finger print recognition mode of authentication and a lower weight to a face recognition mode of authentication. In this way, each mode of authentication can still be employed by adjusting sensitivity, but the contribution of each mode to the overall score is adjusted interactively during the session depending on the session conditions to ensure sufficient integrity of the authentication is maintained.

It is therefore clear that there are advantages in carrying out a multi-tiered user authentication interactively based on the circumstances of the current session, such as the user's current location, the environmental conditions under which the session is taking place, or by comparing the overall circumstances of the current session with historical data for the same user.

SUMMARY OF THE INVENTION

In general, aspects of the present invention provide an approach for user authentication during a user session which potentially requires multiple user authentications. A library of authentication methods is provided for preforming the user authentications. For authentication, a threshold contribution value is set which needs to be exceeded for authentication to occur. To carry out the authentication, a chain of authentication methods is constructed at run time, selected from the library in order to provide an aggregate contribution value which exceeds the threshold. During run time, the contribution value of each authentication method is dynamically adjusted, so that construction of the chain uses current amounts for the contribution values of each authentication method. This allows the chain to be reconstructed at run time taking into account changing circumstances. Specifically, not yet executed authentication methods may be unlinked from the chain and replaced with one or more new ones.

According to a first aspect of the disclosure, there is provided a computer automated authentication method, comprising: providing a plurality of possible authentication methods in an authentication method library; initiating an authentication session with a user requiring a threshold contribution value to be exceeded for authentication to occur; constructing on demand for the authentication session a chain of authentication methods selected from the library of available authentication methods in order to provide an aggregate contribution value from the combined contribution values of the selected ones of the authentication methods which exceeds the threshold contribution value; and commencing execution of the chain with the aim of reaching the threshold contribution value, wherein the contribution value of each authentication method is dynamically adjusted, so that the chain uses current amounts for the contribution values of each authentication method.

A dynamic element to multi-tiered, step-up authentication schemes is thus provided, where this dynamic element differs from standard known schemes by allowing for variations in the structure and effect of policy that is enforced during authentication. The need to predefine authentication policy is removed by delaying the policy creation process until when an authentication needs to take place. In known standard methods, policy creation is typically part of the design that is performed by a human operator beforehand. Namely, a set of rules is devised which aim to deal with all possible scenarios. What we propose is to replace this approach with one that formulates authentication policy at the point in time that it is actually required. This introduces opportunities to refine the policy creation process: for instance. a learning algorithm can be used to make better policy decisions based on past experience and situational awareness.

The chain may use current amounts for the contribution values solely at the time of construction of the chain, or may also continue to use current amounts during execution of the chain. For example, the chain may be reconstructed during execution of the chain taking into account current amounts for the contribution values, so that one or more previously selected, but not yet executed authentication methods may be unlinked from the chain and one or more new authentication methods may be selected from the library to replace them in the chain.

Moreover, the chain may be constructed so as to split into multiple linked sequences in order to present alternative branches to be followed by a conditional authentication.

Further, the step of dynamically adjusting the contribution value of each authentication method may takes into account any authentication methods that have already been selected for existing links in the chain. For example, the step of dynamically adjusting the contribution value of each authentication method can take into account current circumstances of the user, such as user geographical location.

The dynamically adjusted contribution values can be used as the contribution values for at least some of the authentication methods in the chain being executed. Specifically, the dynamically adjusted contribution values can be used for one or both of the contribution values for authentication methods already executed in the chain, so that the aggregate contribution value is revised as the chain is being traversed, and those not yet executed in the chain.

The authentication session may potentially involve multiple authentication events, not just one, wherein the chain that is constructed for each event builds on the chain from previous authentication events, i.e. is an extension of the existing chain.

In some embodiments of the invention, each authentication method has a defined similarity relationship with each other authentication method. The contribution value of an authentication method is dynamically adjusted taking into account a degree of similarity with authentication methods selected to form existing links in the chain, such that presence of similar authentication methods in the chain reduces the contribution value of still selectable authentication methods for adding to the chain. For example, each authentication method has a category assigned to it which forms at least a part of the similarity relationship. The user authentication categories can include at least one of: location of the user device; location of the user; biometrics of the user; possession of the user device; possession of a verification article which is not the user device; code generation; and challenge tests.

A further dynamic feature can be provided so that, in the event of the threshold contribution value not being exceeded by the aggregate contribution value after traversal of the chain, the chain is augmented by selection of at least one further authentication method in an attempt to increase the aggregate contribution value to above the threshold contribution value.

A still further dynamic feature which can be provided is logic to cause the method to terminate if there is no prospect of reaching the threshold contribution value based on current conditions, specifically which authentication methods are available for selection, the current amounts for their contribution values, and the cumulative amount of the aggregate contribution value.

According to a second aspect of the disclosure, there is provided a computer program stored on a computer readable medium and loadable into the internal memory of a digital computer, comprising software code portions, when said program is run on a computer, for performing the method of the first aspect. According to a third aspect of the disclosure, there is provided a computer program product storing the computer program of the second aspect.

According to a third aspect of the disclosure, there is provided an access controller for providing user authentication to a session manager responsible for managing a user session with an application, the access controller comprising:

i) an input/output module operable to receive from the session manager an authentication request relating to a user request to carry out a task within the session and to reply to the authentication request with a pass/fail result;
ii) an authentication score calculator operable to determine a threshold contribution value needed to permit the user to carry out the task;
iii) a data collection component operable to carry out an authentication with the user to obtain an aggregate contribution value and to determine a pass or fail of the user authentication conditional on the aggregate contribution value respectively exceeding or not the threshold contribution value; and
iv) an authentication method library in which is stored a library of possible authentication methods available for user authentication, the data collection component being operable to carry out user authentication for the access controller by: constructing on demand for the authentication session a chain of authentication methods selected from the library of available authentication methods in order to provide an aggregate contribution value from the combined contribution values of the selected ones of the authentication methods which exceeds the threshold contribution value; and commencing execution of the chain with the aim of reaching the threshold contribution value, wherein the contribution value of each authentication method is dynamically adjusted, so that the chain uses current amounts for the contribution values of each authentication method.

According to a fourth aspect of the disclosure, there is provided a computer system for hosting a user session between a user device and an application potentially requiring multiple user authentications to check the identity of the user, the computer system comprising: a session manager for managing the user session; and an access controller according to the third aspect.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, aspects of the present invention provide an approach for user authentication during a user session which potentially requires multiple user authentications. A library of authentication methods is provided for preforming the user authentications. For authentication, a threshold contribution value is set which needs to be exceeded for authentication to occur. To carry out the authentication, a chain of authentication methods is constructed at run time, selected from the library in order to provide an aggregate contribution value which exceeds the threshold. During run time, the contribution value of each authentication method is dynamically adjusted, so that construction of the chain uses current amounts for the contribution values of each authentication method. This allows the chain to be reconstructed at run time taking into account changing circumstances. Specifically, not yet executed authentication methods may be unlinked from the chain and replaced with one or more new ones.

Figure 1:
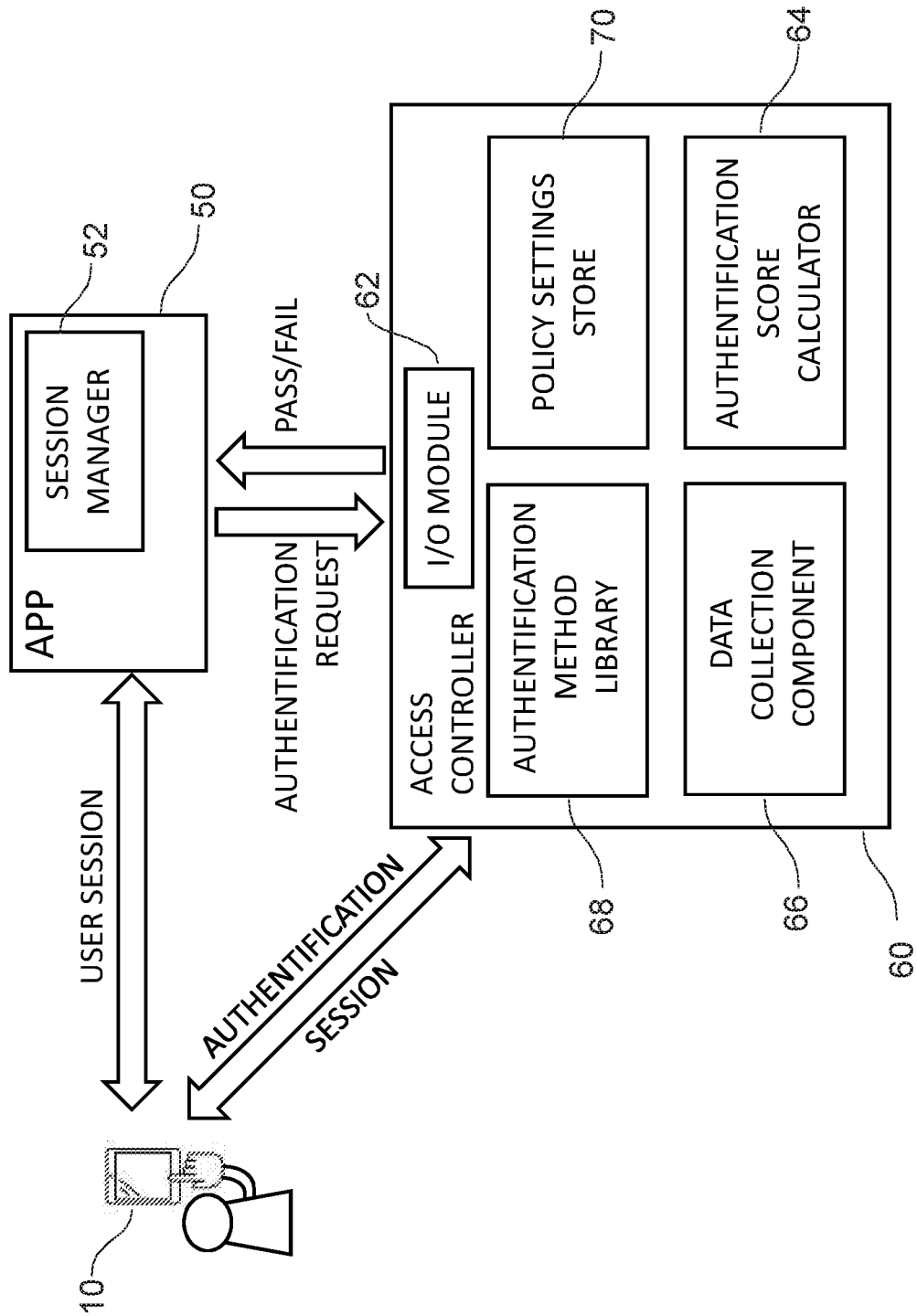
FIG. 1 is a schematic representation of a system embodying the invention according to an embodiment of the invention.

FIG. 1 is a schematic representation of a system embodying the invention. A user, or more precisely a user device 10, conducts a user session with an application or 'app' 50 which has a session manager part 52 for managing the interaction with the user. When the app 50 needs to verify the user's identity as part of a session, it can call an access controller 60 via an input/output (I/O) module 62 of the access controller 50 by sending an authentication request to the access controller 60. The access controller 60 processes the authentication request by interacting with the user to authenticate (or not) the user. The access controller 60 performs the user authentication in an authentication session. After the authentication session, the access controller 60 then passes back a pass or fail result via the I/O module 62 to the app's session manager 52 to indicate whether the user was authenticated successfully or not. The system and in particular the access controller is specifically designed with a view to carrying out multiple authentication sessions within a single user session. Namely, when a second, third, fourth etc. user authentication session is to be carried out in a single user session, the access controller takes into account the previous authentication sessions when configuring and conducting the next authentication session.

For this purpose, the access controller 62 comprises the following elements. An authentication score calculator 64 is provided which is operable to determine a threshold authentication score needed to permit the user to carry out the task to which the authentication request pertains. A data collection component 66 is provided which is operable to carry out an authentication session with the user to obtain an authentication score and to determine a pass or fail of the user authentication conditional on the authentication score respectively exceeding or not the threshold authentication score. An authentication method library 68 is provided in which is stored a suite or library of authentication methods available for user authentication, each authentication method having a category assigned to it. 'Category' is an attribute of authentication method. Authentication methods may also have other attributes which can be factored into authentication method selection. A policy settings store 70 is provided in which is stored a plurality of policy settings for authentication which are initialized at the beginning of each user session. For example, the policy settings can include a score weighting for each authentication method or each category of authentication methods, which is used by the access controller 60 to scale the authentication scores returned by the data collection component 66. The score weightings can be amended responsive to the category-specific policy settings, other attribute-based policy settings and/or responsive to user session conditions. An example of a user session condition for this purpose is geographical location of the user device with which the user session is being conducted.

Figure 2A:
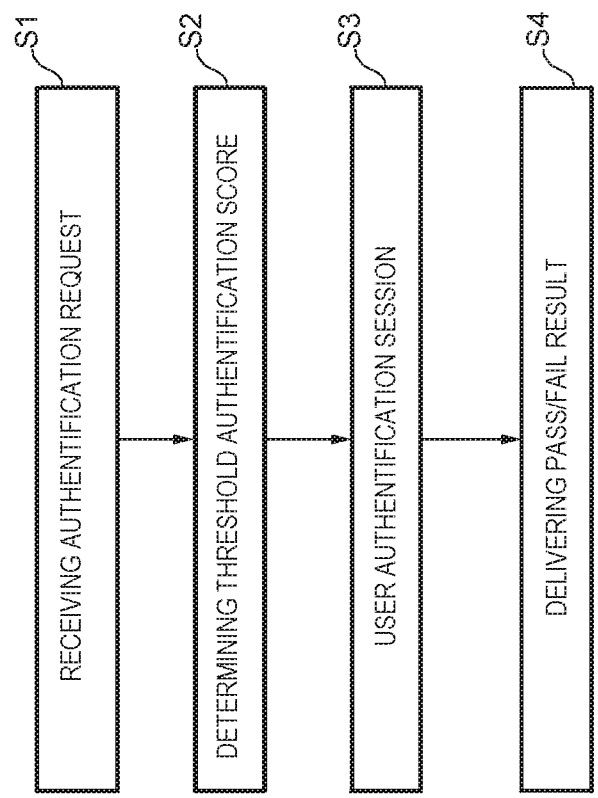
FIG. 2A is a flow diagram of a method for processing an authentication request, involving a user authentication session step, according to an embodiment of the invention.

FIG. 2A is a flow diagram showing how a user authentication request is processed. In Step S1, the access controller 60 receives the request from the app 50. In Step S2, a threshold identification score is determined by the authentication score calculator 64. In Step S3, a user authentication session is then conducted by the data collection component 66. Finally, in Step S4, a pass/fail result of the authentication is determined by comparing the score obtained by the user authentication session with the threshold score calculated by the authentication score calculator 64. This pass/fail result is then returned to the app 50 via the access controller's I/O module 62.

Figure 2B:
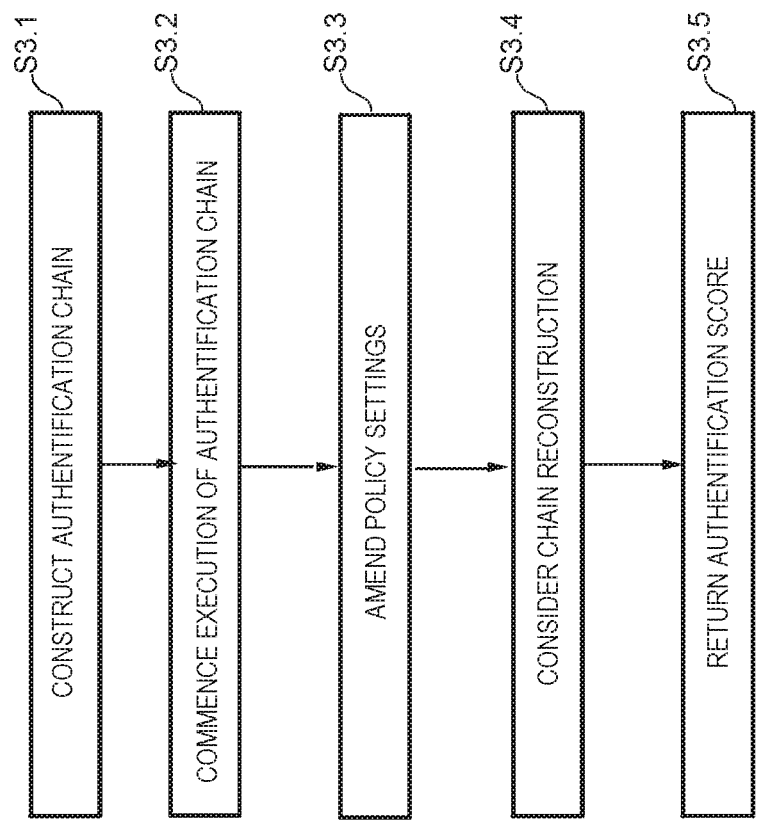
FIG. 2B is a flow diagram showing in more detail sub-steps of the user authentication session step of FIG. 2A according to an embodiment of the invention.

FIG. 2B shows the sub-steps of Step 3 of FIG. 2A in more detail. Namely, the data collection component 66 is operable to carry out Step 3, i.e. the user authentication, by the following sub-steps.

Step S3.1 constructs for the authentication session a chain of authentication methods selected from the library of available authentication methods in order to provide an aggregate contribution value from the combined contribution values of the selected ones of the authentication methods which exceeds the threshold contribution value. The chain construction is done at run time, i.e. as part of the authentication process. This contrasts with prior art methods where the elements in a step-up authentication process are pre-constructed according to fixed rules and always follow a planned sequence at run time. Moreover, the chain construction offers the possibility of linking two alternative authentication methods to the previous authentication method in the chain, where a logical condition is applied during execution to decide which branch to follow. For example, the logical condition may be based on user location, e.g. in a recognized safe zone or not in a recognized safe zone. The chain may thus be split into multiple linked sequences in order to present alternative branches to be followed by a conditional authentication.

Step S3.2 commencing execution of the chain with the aim of reaching the threshold contribution value.

Step S3.3 amends the policy settings so that the contribution value of each authentication method in the library can be dynamically adjusted. It can be decided whether to apply these dynamic adjustments to those authentication methods that are in the current chain or solely to authentication methods that are in the library and not in the current chain. If the dynamically adjusted contribution values are used as the contribution values for at least some of the authentication methods in the chain being executed, then they can be used for one or both of the contribution values for authentication methods already executed in the chain, so that the aggregate contribution value is revised as the chain is being traversed, and those not yet executed in the chain. As a result, the total contribution value from already-executed links may vary (either toward or away from a target threshold). An already-executed method may be effectively removed from the chain by the revision process, by reducing its contribution value to a negligible level (which may then benefit—or hinder—supporting methods further along the chain in reaching the threshold). This moves away from the notion of a statically-defined policy for multi-method authentication (even where those methods have variable contribution values) towards a scheme whereby the authentication chain remains optimal throughout the course of authentication through reconfiguration (in part or in its entirety) to suit the needs at a given point in time. This approach avoids not only the shortcomings, but also the difficulty, in predefining a suitable authentication process that covers all possible scenarios. The approach may be particularly well suited for continuous authentication schemes, for instance, and particularly in situations where the user's 'context' varies over time.

Step S3.4 considers the possibility of reconstructing the current chain is considered taking into account factors such as: the current amounts for the contribution values as adjusted in Step S3.3 and/or current circumstances of the user, such as geographical location. For example, if the user is detected as having left a safe zone, then the contribution value of a subsequent authentication method in the chain may be reduced so severely that this method is unlinked and replaced with another method from the library. Another example might be that if the user fails a biometric authentication method earlier in the chain, then the contribution values of biometric authentication methods may not by dynamically reduced, but kept the same or perhaps increased, so that a chain reconstruction is adopted to add in a further biometric authentication method to allay suspicion that the user is not the user he is purporting to be. (On the other hand, if a biometric authentication method is passed, then it would normally be the case that the contribution value within the same session for other biometric authentication methods would be reduced, since the additional value of a second biometric test would be lower.) In this way, one or more previously selected, but not yet executed authentication methods may be unlinked from the chain and one or more new authentication methods may be selected from the library to replace them in the chain.

Construction and reconstruction of the chain during run time can be based on current amounts for the contribution values of each authentication method, so as to exclude re-use of the selected authentication method within the current session and/or to adjust a category-specific policy setting in respect of the category of the selected authentication method. The category-specific policy setting defines the number of remaining times authentication methods in the same category can be used in the current session, wherein a zero setting indicates authentication methods belonging to that category are now excluded from selection. It will be understood that in an alternative embodiment, Step S3.4 is omitted, i.e. no reconstruction of the chain can take place at run time. Nevertheless, even without chain reconstruction, the dynamic updates of the contribution values can still be applied to adjust the contribution provided by each authentication method as it is executed.

Step S3.5 returns the authentication score to the data collection component. It will be understood that the authentication score can be continually monitored to compare it with the threshold score, so that the execution of the chain can be terminated as soon as the threshold is attained.

The category-specific policy settings may be amended responsive to user session conditions and logic may be provided to implement this function. For example, the user session conditions may include geographical location of the user device with which the user session is being conducted. Certain authentications may only become possible conditional on current geographical location, or may be assigned threshold scores which are greatly increased, if the current geographical location is not deemed to be safe. This is an example of a dynamic constraint being imposed at the time of the authentication, rather than fixed ahead of time.

Suitable user authentication categories include at least one of: location of the user device; location of the user; biometrics of the user; possession of the user device; possession of a verification article which is not the user device; code generation; and challenge tests. An example possession-based test would be a method that analyzes user behavior in relation to a device, e.g. a user's keystroke rate. Another such possession-based test would be sending a short code, e.g. a 4-digit code, to the user's smartphone. Both example tests are similar in that they serve to prove the presence of a specific device, although they do this in a different way. Using these two methods in combination during a single session is thus likely to be less secure than using one of these possession-based methods with a method from another category, such as a location-based test. That is to say, features selected from disjoint sets are likely to be more secure, in general, on the basis of increased diversity from non-repeating aspects and features. Thus a tiered, or multi-factor, authentication scheme should aim to combine diverse methods rather than methods with similar features.

The category assigned to each authentication method is a specific example of an element in similarity function which is associated with each authentication method and allows any two authentication methods to be compared to determine a degree of similarity between those two authentication methods. The contribution value of an authentication method can then be dynamically adjusted taking into account a degree of similarity with authentication methods selected to form existing links in the chain, such that presence of similar authentication methods in the chain reduces the contribution value of still selectable authentication methods for adding to the chain.

It is a useful feature if the access controller is further operable in the event of an authentication score not exceeding the threshold to extend the authentication session by selecting and instantiating another authentication method, rather than declaring a 'fail'. This allows the aggregate authentication score for the authentication session to be increased by carrying out at least one further authentication method with the user. Moreover, if the session extends after execution of the original chain to carry out one authentication event to include a second authentication event, the chain for the second authentication event can be built on the existing chain used for the first authentication event, thereby taking into account the first authentication event in the selection of the authentication methods to use for the second authentication event. The same approach can be extended to third and subsequent authentication events in the same session.

If desired, the authentication session can be indefinitely extended until either the threshold score is exceeded or the policy settings preclude selection of any further authentication methods. The authentication score then becomes an aggregation, i.e. combination, of the authentication scores obtained by the multiple invocations of the data collection component in respect of the same authentication session. For example, it may be that a particularly high threshold authentication score has been set, and that none of the remaining suitable authentication methods selectable according to the current policy settings can, on their own, provide a high enough authentication score to exceed the threshold. This approach of carrying out multiple authentications when servicing a single authentication request provides a way around this limitation.

Another useful feature is if the policy settings include a terminate setting which may be set by the data collection component to indicate to the access controller that there are now no authentication methods which can be selected in the current session in view of the current policy settings. In other words, when the possibilities for successful authentication have been exhausted within a particular user session having regard to previously performed authentication sessions, the size and diversity of the authentication method library and the way in which the policy settings have evolved during the current user session, then the terminate setting is a flag which shows the access controller that it is fruitless to continue. The app 50 is preferably provided with access to the terminate setting flag. In response to becoming aware of the terminate setting, the session manager 52 of the app 50 can, for example, either decide to terminate the user session, or to reset the policy settings in the access controller back to their original condition for the beginning of a user session.

In use, the system is able to carry out the following computer automated method for providing pass and fail results for a user authentication to a session manager responsible for managing a user session. The method involves: (i) receiving from the session manager an authentication request relating to a user request to carry out a task within the session; (ii) determining a threshold authentication score needed to permit the user to carry out the task; (iii) carrying out an authentication with the user to obtain an authentication score and to determine a pass or fail of the user authentication conditional on the authentication score respectively exceeding or not the threshold authentication score; and (iv) replying to the authentication request with a pass/fail result. The user authentication is based on applying policy settings which are initialized for each user session and is carried out by: (a) selecting an authentication method from a library of authentication methods based on the current policy settings, wherein each authentication method has a category assigned to it; (b) undergoing authentication with the user using the selected authentication method to obtain an authentication score; (c) amending the policy settings to exclude re-use of the selected authentication method within the current session and to adjust a category-specific policy setting in respect of the category of the selected authentication method; and (d) returning the authentication score.

With this approach each authentication within a given user session can be thought of as one link in a chain of authentications, wherein each new link is selected and performed based on the existing links of the chain. A link represents a single authentication method and has one or more properties that determine how the link may connect to other links in the chain, or at least how likely it is to be selected for being linked with new links in the chain.

We now describe this approach with the aid of a specific example, namely an online banking application carried out on a user device, such as a smartphone, tablet or computer, in which the user wishes to login to his account, check his balance, make an online payment and edit his personal profile.

First, the customer opens the banking app on their smartphone and is presented with an initial prompt to log in. The prompt is an authentication method selected by the bank from a list of available methods in the authentication method library in accordance with the bank's access control policy (i.e. Authentication 1). This selection process is linked to the initial page of the banking app. As well as a username/password login, the user's current location is also factored in to the authentication. Namely, the access controller detects that the user device is located at the user's home and this is recognized by the access controller as a pre-registered 'safe zone'. For example, the home location can either be considered to be an authentication method which contributes to an aggregate authentication score with the username/password login, or can be a policy setting parameter which has the effect in the calculation of the threshold to reduce the threshold score needed for a successful login. If the device were not in a safe zone, then providing a username/password combination would not alone provide a sufficient authentication score to exceed the threshold, so at least a second authentication method would have to be selected.

Having successfully authenticated, the user reads his account balance and decides to make a one-time payment. The payment is viewed by the bank as a higher risk and so additional authentication is required to increase the confidence in the authenticity of the user's identity (i.e. Authentication 2). Furthermore, the policy settings discourage selection of multiple authentication methods of the same category or authentication methods of the same category which are too similar to each other, wherein 'category' and 'similarity' are measures of the method's category and other attributes respectively.

The user then selects the payment page, which is deemed to be a higher risk again, and is therefore prompted to authenticate again (i.e. Authentication 3). The user passes this authentication by selecting points on an image recently registered with the bank and makes an online payment. Finally, the user chooses to make a change to his personal profile at the bank, e.g. change of telephone number, and selects the appropriate page. Once again this is deemed to be an even higher risk, so the user is prompted to authenticate (i.e. Authentication 4). This time a biometric-category authentication method is selected in the form of voice recognition. The user speaks into the phone to provide authentication.

With this type of approach, as exemplified with the online banking example above, the access controller's selection of a suitable authentication method takes into account what category of authentication method was already performed in the user session. Namely, in the online banking example, the selections after the initial login (i.e. Authentication 1) take account that the authentication of the initial login relied in part on the user being at a particular location, i.e. in a pre-registered 'safe zone'. The approach reduces the potential value of an authentication method for subsequent links in an authentication chain which shares one or more features with an earlier method already used in the chain, i.e. in the same session, whether that be a 'location' method, such as in the online banking example, or another category of authentication method, such as an 'activity' method. This dynamic adjustment is made possible by classifying methods, tracking their use during a user session and making adjustments to the future contribution value of each method, i.e. how much of an authentication score it can deliver, if it is used during the session, based on what has already occurred during the current user session in terms of which other authentication methods have already been carried out. For example, authenticating with a knowledge-based method may cause policy settings to be adjusted so as to reduce the potential contribution of subsequent knowledge-based methods applied in the same user session, perhaps by a factor determined by some feature or stored value associated with the just-performed knowledge-based method.

Applying tiered authentications in this way may thus be visualized in terms of constructing authentication sequences (or "chains") that exhibit dynamic features, i.e. features which depend on the previous 'links' of the current chain. Policy decisions may be delayed until the authentication session has begun (and the policy is enforced). For instance, by categorizing methods, there is no longer a need to explicitly state which methods should be executed ahead of time. Rather, dynamic control over instantiation of specific authentication methods is exercised through policy settings, which are continually updated during a user session taking into account previous 'links' and optionally also other factors such as user (device) location.

The authentication methods ('links') can thus be coupled and uncoupled dynamically during a user session in an authentication chain and in combination aim to reach a contribution value to exceed a threshold required for authentication. Moreover, the dynamic nature of the method allows for adjustments to be made to individual links, e.g. the score associated with carrying out a particular authentication method can be varied dynamically in accordance with system-wide policy settings. For instance, the exclusion of further possession-based methods in subsequent authentication methods within a given user session may be relaxed by adjusting the policy setting to discourage, but not preclude, repeated use of this category of method.

In addition, links can be arranged as required during an authentication session in an attempt to attain a particular score that is the threshold for passing the authentication test in hand. As an additional benefit, the chain may split into multiple linked sequences in order to present alternative arrangements for conditional authentication evaluations.

The unlinking is triggered by a change in state that causes one or more preconditions to fail. Each link can be thought of as consisting of pre- and post-conditions and how each link is connected to the chain during authentication to suit the specific requirements at that time. If all preconditions are met, then a link may be added to the chain, and conversely should a precondition subsequently fail, then the link should be removed. Change may be influenced by environmental effects, user interaction or by the evolving nature of the chain itself (e.g. a precondition may test for a particular configuration in the chain).

The method is preferably carried out as a step-up authentication method, by which is meant that the system will not prompt the user for further authentication, when the user accesses a function or page of a lower risk level to that which has already been authenticated. This is a desirable feature for ensuring that the user's experience of the authentication process is not unduly onerous.

Figure 3:
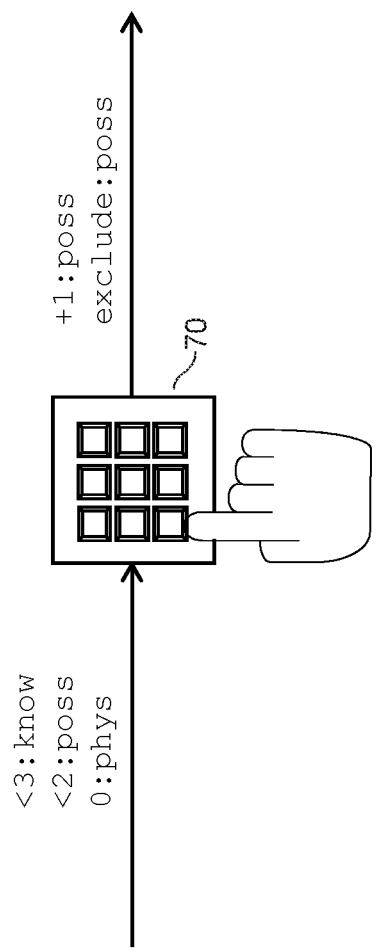
FIG. 3 is a schematic representation of a specific example according to an embodiment of the invention.

FIG. 3 shows a specific example of policy settings of a chip and PIN authentication method carried out via a numeric button array 70 on a touch screen or physical keypad. The policy settings are:

(entry): <3 from cat:knowledge, <2 from cat:possession, 0 from cat:physical, (exit): +1 to cat:possession, exclude link to cat: possession . . .

where this may be translated as 'no greater than 2 prior knowledge-based methods, no greater than 1 prior possession-based methods and zero physical-based methods' on the entry link, and 'add one to possession category, exclude (i.e. allow zero) further possession methods' on the exit link. Here the terms 'entry link' and 'exit link' are used to refer to the policy settings respectively before and after the chip and PIN authentication method has been carried out.

The access controller evaluates the policy settings at the time when the link is invoked in the authentication chain, and either: (i) fails to execute the associated authentication method, due to a failure to satisfy the required entry conditions (i.e. policy settings), or (ii) executes the associated authentication method, due to all entry conditions being met.

In either case, this link is now marked as 'dirty', which in this implementation ensures that it cannot be called again during the current authentication session. Should all entry conditions be met, the access controller will then call on the data collection component to perform the necessary analysis for verification by Chip and PIN. The result of this analysis will contribute to a link property that represents the current score (i.e. confidence). This property will be passed to the next link in the chain, assuming that the exit criteria can be met in its entirety. In order to meet the exit criteria, the access controller needs to identify an appropriate link with compatible properties, i.e. in this example must not be a member of the 'possession' category. This process repeats until the authentication chain ends (with a special 'end link') or until no compatible links are found to attach to the current link, i.e. no authentication method can be found in the library which satisfies the policy settings and can therefore be 'joined' to the 'end link'. The authentication chain ends with an 'end link' which consists of the following policy statement (as a minimum):

(entry): chain end with link:score.

An 'end' link is responsible for reporting the current value of the 'score' property to the access controller.

Figure 4:
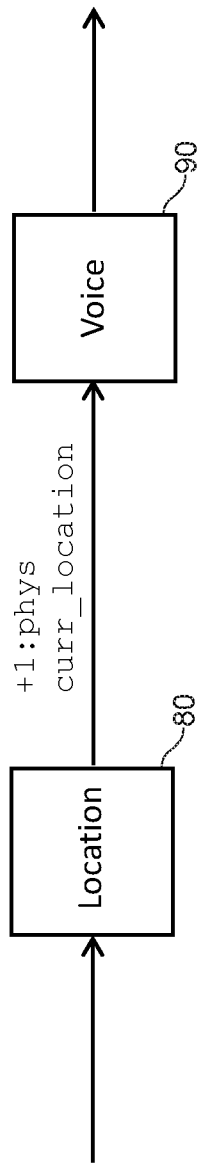
FIG. 4 is a schematic representation of another specific example according to an embodiment of the invention.

FIG. 4 shows a specific example of how properties of a 'used' link propagate through to subsequent links of the chain through policy settings within a given user session. In other words, a predecessor authentication method influences policy enforcement on successor authentication methods. In this example, a two-stage authentication chain consists of a location method 80 and a biometric method 90, labeled 'voice' by way of example to indicate a voice recognition method. The first method 80 (location) detects the geospatial position of the device, which may be used to raise the authentication tier for some basic operations. The context gained during the first method (location) is passed along the chain and utilized by the second method 90 (biometric). The policy settings also ensure that the biometric method is enabled for selection by the access controller only when the device is in a registered location (e.g. at home), or alternatively that the relative contribution to the authentication score of the biometric method is scaled up or down conditional on the device being at a registered location. In cases where the device is not located in a registered location, the biometric method is thus either not enabled, or has its contribution scaled down. In this way, the behavior of the methods in the authentication chain reacts to the context that passes along the chain through the continually amended policy settings and is therefore able to respond to dynamic changes in environment. The policy settings in the security architecture of the access controller are responsible for assigning current relative contribution of a method during a user session. The current policy settings will determine how much of a part each method in the chain will contribute, based on conditions determined by one or more methods. In this example, if the user is not located in a registered location (at the time of authentication), then the policy manager may reduce the relative contribution of biometric methods, or prevent biometric methods from being selected for authentication.

A further useful feature is to use timeout periods. Namely, a timeout period can be associated with one or more authentication methods, such that each such method is reassessed at regular time intervals regardless of user activity. To balance the need for effective security and usability, the timeout period is only applied to non-interactive methods in this example (e.g. the location method), thus ensuring the user is not regularly prompted to authenticate. As the predefined period of time expires, the system will reapply this method to assess the present location of the device: should the device have moved outside of a 'safe zone' then the contribution value of the location method will be less (potentially zero) and the authentication chain will dynamically rearrange to accommodate this change in context and possibly introduce additional authentication methods to compensate, e.g. by raising the threshold authentication score so that multiple authentication methods are needed to attain the threshold. The effect of this rearrangement may be reversed (again potentially, depending on policy) by moving the device back into the 'safe zone'. This example demonstrates how external context (i.e. the location of the device) may be used to periodically affect the dynamics of the chain during an application session, which is akin to continuous authentication schemes.

Figure 5:
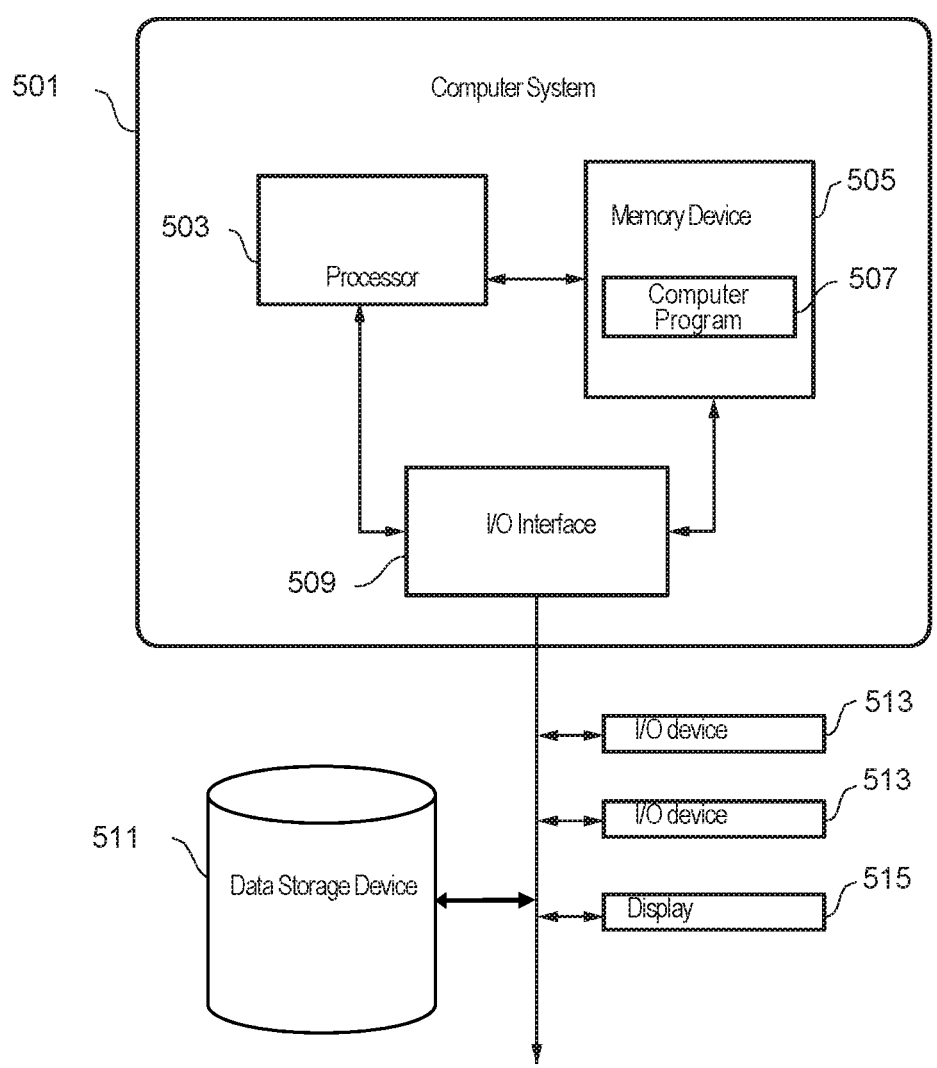
FIG. 5 shows a generic computer capable of hosting systems embodying the invention according to an embodiment of the invention.

FIG. 5 shows a structure of a computer system 501 and computer program 507 that may be used to implement the above-described methods embodying the present invention. The computer system 501 comprises a processor 503 coupled through one or more I/O Interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 contains stored computer program 507, which is a computer program that comprises computer-executable instructions. The stored computer program 507 includes a program that implements a method for the efficient selection of runtime rules for programmable search in accordance with the present example. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatuses, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary of the above-described embodiments, there has been described in the above detailed description a system and method user authentication during a user session which potentially requires multiple user authentications. A library of authentication methods is provided for use by an access controller which is responsible for carrying out the user authentications. Each authentication method has a category assigned to it. An authentication method is selected dynamically during a session based on policy settings which are initialized at the beginning of each user session. Each time an authentication is required, an authentication method is selected from the library based on the current policy settings. The policy settings are amended as part of each authentication to exclude re-use of the selected authentication method within the current session and to adjust a category-specific policy setting in respect of the category of the selected authentication method to at least discourage, and possibly preclude, selection of other authentication methods during the same session, if they are deemed to be too similar to the authentication method just used in the same user session, or the combination of authentication methods already used in the same user session.

According to a first aspect of the above-described embodiments, there is provided an access controller for providing pass and fail results for a user authentication to a session manager responsible for managing a user session with an application, wherein during a user session the session manager potentially requires multiple user authentications to check the identity of the user, the access controller comprising:

i) an input/output module operable to receive from the session manager an authentication request relating to a user request to carry out a task within the session and to reply to the authentication request with a pass/fail result;
ii) an authentication score calculator operable to determine a threshold authentication score needed to permit the user to carry out the task;
iii) a data collection component operable to carry out an authentication with the user to obtain an authentication score and to determine a pass or fail of the user authentication conditional on the authentication score respectively exceeding or not the threshold authentication score;
iv) an authentication method library in which is stored a library of authentication methods available for user authentication, each authentication method having a category assigned to it; and
v) a policy settings store in which is stored a plurality of policy settings for authentication which are initialized at the beginning of each user session, wherein the data collection component is operable to carry out user authentication for the access controller by:
i) selecting an authentication method from the library of authentication methods based on the current policy settings;
ii) undergoing authentication with the user using the selected authentication method to obtain an authentication score;
iii) amending the policy settings to exclude re-use of the selected authentication method within the current session and to adjust a category-specific policy setting in respect of the category of the selected authentication method; and
iv) returning the authentication score to the data collection component.

The category-specific policy setting may define the number of remaining times authentication methods in the same category can be used in the current session, wherein a zero setting indicates authentication methods belonging to that category are now excluded from selection. Logic may be provided which is operable to amend the category-specific policy settings responsive to user session conditions. The user session conditions can include geographical location of the user device with which the user session is being conducted. The policy settings may include a score weighting for each authentication method or each category of authentication methods, which is used by the access controller to scale the authentication scores returned by the data collection component. For example, the score weightings can be amended responsive to the category-specific policy settings and/or user session conditions. The user session conditions can include geographical location of the user device with which the user session is being conducted.

Example user authentication categories include at least one of: location of the user device; location of the user; biometrics of the user; possession of the user device; possession of a verification article which is not the user device; code generation; and challenge tests.

In certain embodiments, the access controller is further operable in the event of a fail to invoke the data collection component again before returning a fail to the session manager in an attempt to increase the authentication score by carrying out a further authentication method with the user, wherein the authentication score is an aggregation of the authentication scores obtained by the multiple invocations of the data collection component in respect of the same task.

In certain embodiments, the policy settings include a terminate setting which may be set by the data collection component to indicate to the access controller that there are now no authentication methods which can be selected in the current session in view of the current policy settings.

According to a second aspect of the above-described embodiments, there is provided a computer system for hosting a user session between a user device and an application potentially requiring multiple user authentications to check the identity of the user, the computer system comprising: a session manager for managing the user session; and an access controller according to the first aspect.

According to a third aspect of the above-described embodiments, there is provided a computer automated method for providing pass and fail results for a user authentication to a session manager responsible for managing a user session with an application potentially requiring multiple user authentications to check the identity of the user, the method comprising:
  i) receiving from the session manager an authentication request relating to a user request to carry out a task within the session;
  ii) determining a threshold authentication score needed to permit the user to carry out the task;
  iii) carrying out an authentication with the user to obtain an authentication score and to determine a pass or fail of the user authentication conditional on the authentication score respectively exceeding or not the threshold authentication score; and
  iv) replying to the authentication request with a pass/fail result, wherein user authentication is based on applying policy settings which are initialized for each user session and is carried out by:
    a) selecting an authentication method from a library of authentication methods based on the current policy settings, wherein each authentication method has a category assigned to it;
    b) undergoing authentication with the user using the selected authentication method to obtain an authentication score;
    c) amending the policy settings to exclude re-use of the selected authentication method within the current session and to adjust a category-specific policy setting in respect of the category of the selected authentication method; and
    d) returning the authentication score.

According to a fourth aspect of the above-described embodiments, there is provided a computer program stored on a computer readable medium and loadable into the internal memory of a digital computer, comprising software code portions, when said program is run on a computer, for performing the method of the third aspect. According to a fifth aspect of the above-described embodiments, there is provided a computer program product storing the computer program of the fourth aspect.

According to a sixth aspect of the above-described embodiments, there is provided a computer automated method for authentication of a user's purported identity when the user is logged into a session of a computer application, the method comprising:
  providing a plurality of authentication methods which are made available to the computer application for user authentication, each authentication method having a defined similarity relationship with each other authentication method;
  receiving a user request to carry out a first task within the application;
  determining a first threshold authentication score needed to permit the user to carry out the first task;
  selecting a first authentication method;
  conducting a first authentication process with the user by applying the first authentication method to obtain a first authentication score;
  permitting the user to carry out the first task conditional on the first authentication score exceeding the threshold authentication score;
  receiving a user request to carry out a second task within the application;
  determining a second threshold authentication score needed to permit the user to carry out the second task;
  selecting a second authentication method from among the plurality of identification methods, excluding the first authentication method which has already been applied, based on lack of similarity with the first authentication method;
  conducting a second authentication process with the user by applying the second authentication method to obtain a second authentication score;
  permitting the user to carry out the second task conditional on the second authentication score exceeding the second threshold authentication score.

According to a seventh aspect of the above-described embodiments, there is provided a computer program stored on a computer readable medium and loadable into the internal memory of a digital computer, comprising software code portions, when said program is run on a computer, for performing the method of the sixth aspect.

According to an eighth aspect of the above-described embodiments, there is provided computer program product storing the computer program of the seventh aspect.

It will be clear to one skilled in the art that many improvements and modifications can be made to the foregoing exemplary embodiment without departing from the scope of the present disclosure.

What is claimed is:

1. A computer automated authentication method, comprising:
  assigning, in response to a request by a user for access to an area of a computer system, a contribution value to each authentication method of a plurality of possible authentication methods in an authentication method library, wherein each contribution value is a numerical value that is a weighted score that is assigned to a specific authentication method that quantifies an authenticating value of the specific authentication method with respect to each other authentication method, wherein each authentication method has a defined similarity relationship with each other authentication method, and wherein each authentication method has a category from among a plurality of user authentication categories assigned to it which forms at least a part of the similarity relationship;
  initiating, in response to the request by the user for access to the area of the computer system, an authentication session with the user by determining a threshold contribution value corresponding to the area to be exceeded for authentication to occur;
  constructing, in response to the request, a chain of authentication methods that is specific to the request and has a plurality of authentication methods selected from the authentication method library of available authentication methods in order to provide an aggregate contribution value from a combination of contribution values of the selected ones of the authentication methods which exceeds the threshold contribution value corresponding to the area, such that a first chain dynamically constructed in response to a first request to access the area has different authentication methods from a second chain dynamically constructed in response to a second request to access the area, wherein the first chain dynamically constructed and the second chain dynamically constructed are done at run time; and commencing execution of the chain with an aim of reaching the threshold contribution value, wherein the contribution value of each associated authentication method is dynamically adjusted at run time, so that the chain uses current amounts for the combined contribution values of each authentication method, wherein the contribution value of an associated authentication method is dynamically adjusted by changing the numerical value at run time based on authentication methods that have been selected to form existing links in the chain.

2. The method of claim 1, wherein the chain is reconstructed during execution of the chain taking into account current amounts for the combined contribution values, so that one or more previously selected, but not yet executed authentication methods is unlinked from the chain and one or more new authentication methods is selected from the authentication method library to replace them in the chain.

3. The method of claim 1, wherein the chain is constructed so as to split into multiple linked sequences in order to present alternative branches to be followed by a conditional authentication.

4. The method of claim 1, wherein the step of dynamically adjusting the contribution value of each associated authentication method takes into account any authentication methods that have already been selected for existing links in the chain.

5. The method of claim 1, wherein the step of dynamically adjusting the contribution value of each associated authentication method takes into account current circumstances of the user.

6. The method of claim 5, wherein the current circumstances of the user include user geographical location.

7. The method of claim 1, wherein the dynamically adjusted contribution values are used as the combined contribution values for at least some of the authentication methods in the chain being executed.

8. The method of claim 7, wherein the dynamically adjusted combined contribution values are used as the contribution values for authentication methods not yet executed in the chain.

9. The method of claim 7, wherein the dynamically adjusted combined contribution values are used as the contribution values for authentication methods already executed in the chain, so that the aggregate contribution value is revised as the chain is being traversed.

10. The method of claim 7, wherein the dynamically adjusted contribution values are used as the combined contribution values both for authentication methods already executed in the chain and those not yet executed in the chain.

11. The method of claim 1, wherein the authentication session potentially involves multiple authentication events, each event needing an authentication session, wherein the chain constructed for each event builds on the chain from previous events.

12. The method of claim 1, wherein the contribution value of an authentication method is dynamically adjusted taking into account a degree of similarity with authentication methods selected to form existing links in the chain, such that presence of similar authentication methods in the chain reduces the contribution value of still selectable authentication methods for adding to the chain.

13. The method of claim 11, wherein the user authentication categories include at least one of: location of the user device; location of the user; biometrics of the user; possession of the user device; possession of a verification article which is not the user device; code generation; and challenge tests.

14. The method of claim 1, wherein the chain is constructed to ensure that a summation of numerical values of the contribution values of the authentication methods that have been selected to form existing links in the chain exceeds a numerical value of the threshold contribution value corresponding to the area;

wherein in an event of the threshold contribution value not being exceeded by the aggregate contribution value after traversal of the chain, the chain is augmented by selection of at least one further authentication method in an attempt to increase the aggregate contribution value to above the threshold contribution value; and wherein the chain has a first authentication method that is followed in the chain of authentication methods used to authenticate the user by a second authentication method, such that the numerical value of the contribution value of the first authentication method is greater than the numerical value of the contribution value of the second authentication method.

15. The method of claim 1, wherein the method terminates if there is no prospect of reaching the threshold contribution value based on which authentication methods are available for selection, the current amounts for their contribution values, and the cumulative amount of the aggregate contribution value.

16. A computer program product stored on a computer readable medium, which is not a propagated signal, and loadable into the internal memory of a digital computer, comprising software code portions, when said program is run on a computer, for performing a method, comprising:

assigning, in response to a request by a user for access to an area of a computer system, a contribution value to each authentication method of a plurality of possible authentication methods in an authentication method library, wherein each contribution value is a numerical value that is a weighted score that is assigned to a specific authentication method that quantifies an authenticating value of the specific authentication method with respect to each other authentication method, wherein each authentication method has a defined similarity relationship with each other authentication method, and wherein each authentication method has a category from among a plurality of user authentication categories assigned to it which forms at least a part of the similarity relationship;

initiating, in response to the request by the user for access to the area of the computer system, an authentication session with the user by determining a threshold contribution value corresponding to the area to be exceeded for authentication to occur;

constructing, in response to the request, a chain of authentication methods that is specific to the request and has a plurality of authentication methods selected from the authentication method library of available authentication methods in order to provide an aggregate contribution value from a combination of contribution values of the selected ones of the authentication methods which exceeds the threshold contribution value corresponding to the area, such that a first chain dynamically constructed in response to a first request to access the area has different authentication methods from a second chain dynamically constructed in response to a second request to access the area, wherein the first chain dynamically constructed and the second chain dynamically constructed are done at run time; and commencing execution of the chain with an aim of reaching the threshold contribution value, wherein the contribution value of each associated authentication method is dynamically adjusted at run time, so that the chain uses current amounts for the combined contribution values of each authentication method, wherein the contribution value of an associated authentication method is dynamically adjusted by changing the numerical value at run time based on authentication methods that have been selected to form existing links in the chain.

17. The program product of claim 16, wherein the contribution value of an associated authentication method is dynamically adjusted taking into account a degree of similarity with authentication methods selected to form existing links in the chain, such that presence of similar authentication methods in the chain reduces the contribution value of still selectable authentication methods for adding to the chain, and wherein the user authentication categories include at least one of: location of the user device; location of the user; biometrics of the user; possession of the user device; possession of a verification article which is not the user device; code generation; and challenge tests.

18. A computer implemented system for providing user authentication to a session manager responsible for managing a user session with an application, comprising:

a memory comprising instructions;

a bus coupled to the memory; and a processing unit coupled to the bus that when executing the instructions causes the system to:

assign, in response to a request by a user request to carry out a task that accesses an area of a computer system within the session, a contribution value to each authentication method of a plurality of possible authentication methods in an authentication method library, wherein each contribution value is a numerical value that is a weighted score that is assigned to a specific authentication method that quantifies an authenticating value of the specific authentication method with respect to each other authentication method, wherein each authentication method has a defined similarity relationship with each other authentication method, and wherein each authentication method has a category from among a plurality of user authentication categories assigned to it which forms at least a part of the similarity relationship;

receive from the session manager an authentication request relating to the user request to carry out the task that accesses the area of a computer system within the session and to reply to the authentication request with a pass/fail result;

determine a threshold contribution value needed to permit the user to carry out the task based on the area;

carry out, in response to the authentication request, an authentication with the user to obtain an aggregate contribution value and to determine a pass or fail of the user authentication conditional on the aggregate contribution value respectively exceeding or not the threshold contribution value by constructing a chain of authentication methods that is specific to the request and has a plurality of authentication methods selected from the authentication method library of available authentication methods in order to provide an aggregate contribution value a combination of combined contribution values of the selected ones of the authentication methods which exceeds the threshold contribution value corresponding to the area, such that a first chain dynamically constructed in response to a first request to access the area has different authentication methods from a second chain dynamically constructed in response to a second request to access the area, wherein the first chain dynamically constructed and the second chain dynamically constructed are done at run time; and commence execution of the chain with an aim of reaching the threshold contribution value, wherein the contribution value of each associated authentication method is dynamically adjusted at run time, so that the chain uses current amounts for the combined contribution values of each authentication method, wherein the contribution value of an associated authentication method is dynamically adjusted by changing the numerical value at run time based on authentication methods that have been selected to form existing links in the chain.

19. The computer implemented system of claim 18, wherein the contribution value of an associated authentication method is dynamically adjusted taking into account a degree of similarity with authentication methods selected to form existing links in the chain, such that presence of similar authentication methods in the chain reduces the contribution value of still selectable authentication methods for adding to the chain, and wherein the user authentication categories include at least one of: location of the user device; location of the user; biometrics of the user; possession of the user device; possession of a verification article which is not the user device; code generation; and challenge tests.

* * * * *